Patented July 21, 1931

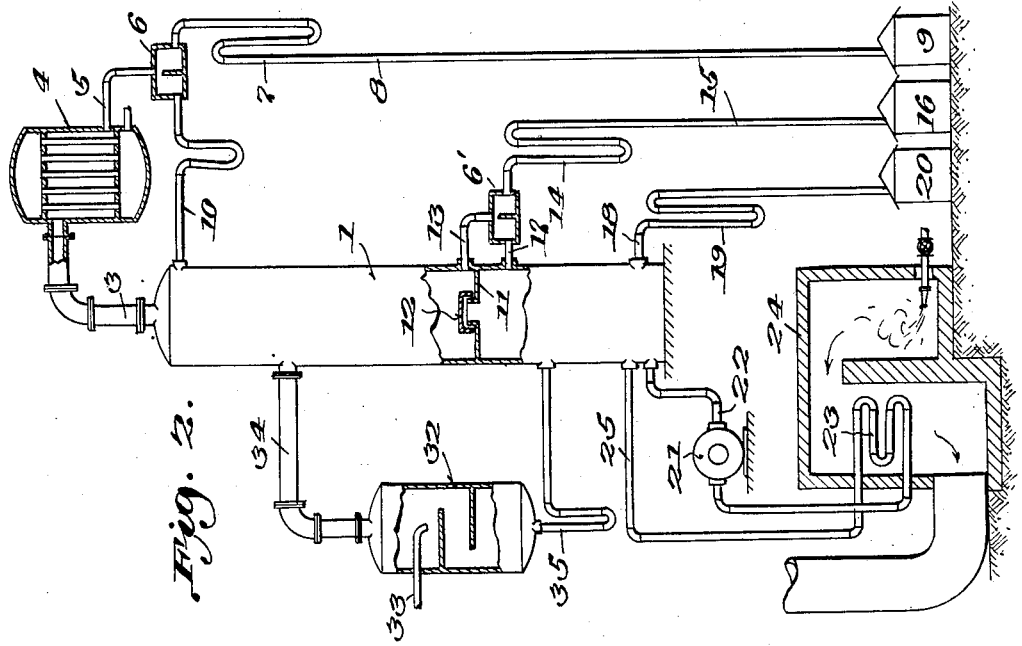
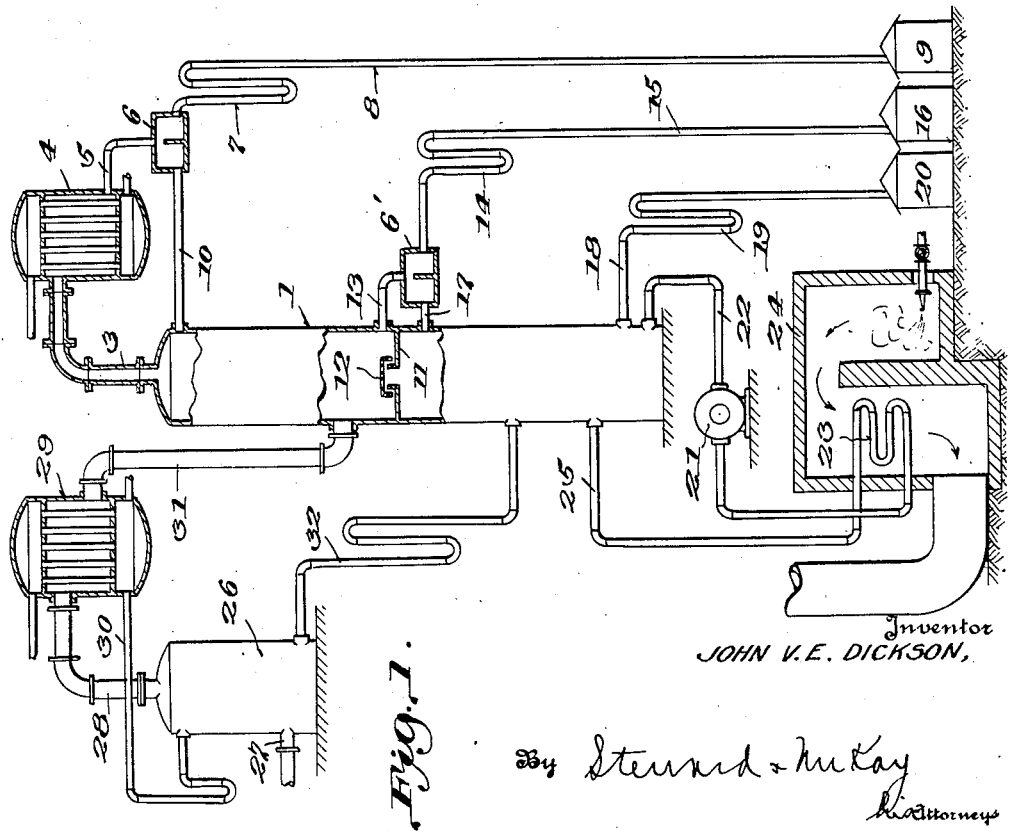

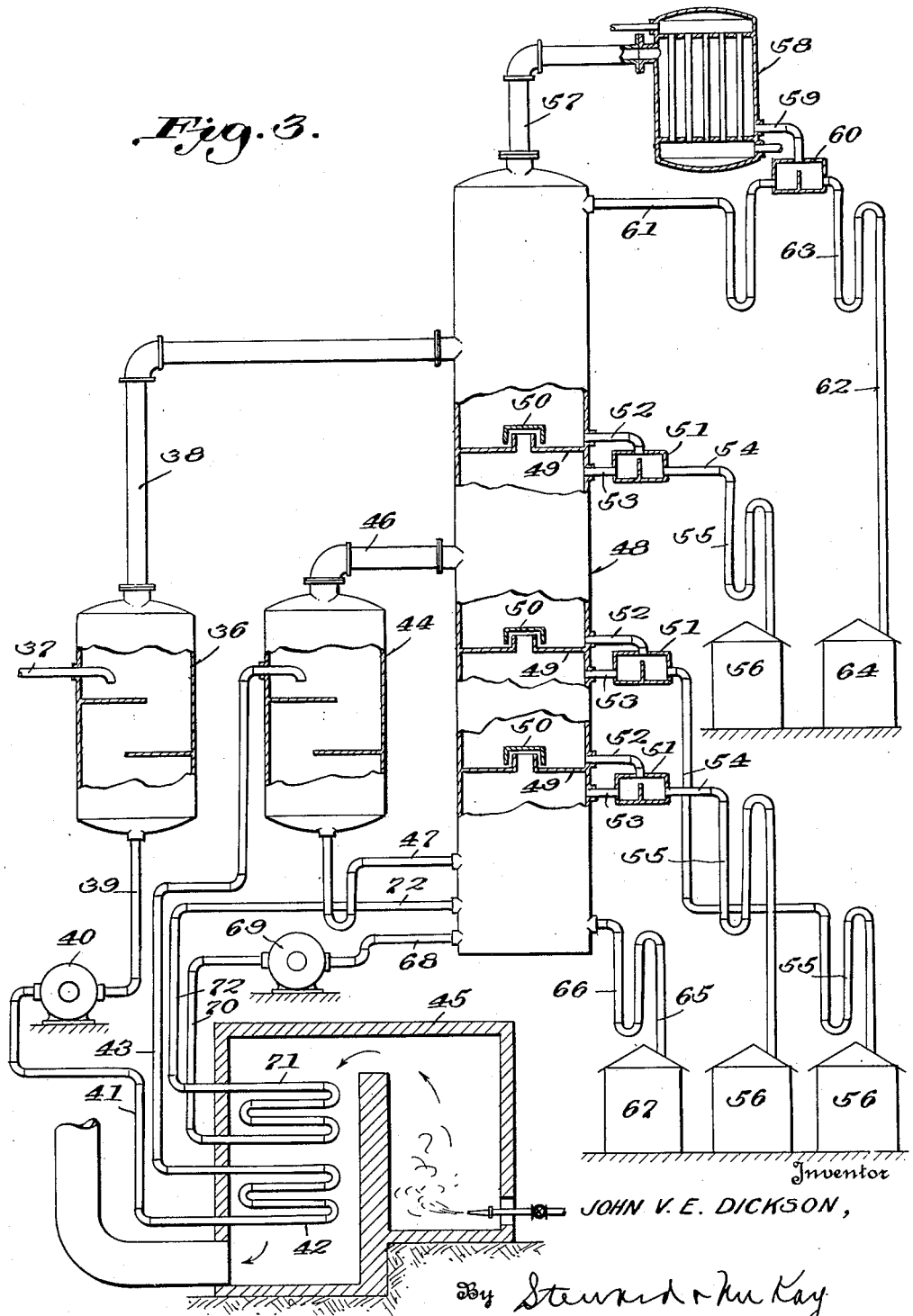

1,815,127

UNITED STATES PATENT OFFICE

JOHN V. E. DICKSON, OF WEST NEW YORK, NEW JERSEY, ASSIGNOR, BY MESNE ASSIGNMENTS, TO E. B. BADGER & SONS COMPANY, OF BOSTON, MASSACHUSETTS, A CORPORATION OF MASSACHUSETTS

PROCESS OF FRACTIONATION OF MIXED FLUIDS

Application filed February 11, 1925. Serial No. 8,318.

This invention relates to the fractionation of mixtures of oils or other substances in processes of continuous distillation, or similar processes, such as those of what is known as "cracking" of oils, when carried out in a continuous or semi-continuous manner, and it particularly applies to such comparatively high-temperature processes as are used in the petroleum and coal-tar industries. In such processes the oil or mixture is commonly heated while passing through a series of pipes or other heating means, set in a furnace, and discharged into a separating chamber in which the vapors formed by heating are separated by gravity from the part of the mixture which remains liquid. The vapors then pass on and are condensed, while the liquid is collected separately. This, however, does not make a good separation of the oil into two fractions, the vapors carrying with them a part of the heavier material which it is preferable to retain in the liquid, and the latter retaining lighter material which for proper separation should pass off with the vapor. Moreover, it is often desirable to obtain two or more distinct fractions of different boiling ranges, from the vaporized portion, besides the residue which has not been vaporized.

In order to obtain the desired results it has usually been necessary to resort to a redistillation either of the total condensate or of some of the fractions obtained by a rough fractional condensation. In order to avoid redistillation, a variety of fractionating condensers, dephlegmators, towers and columns have been used, but in most cases these have not led to completely satisfactory results. The apparatus and methods used fail to give the best fractioning results for various reasons but in general they have the common fault of condensing each fraction in contact with a stream of vapors containing all the constituents having lower boiling points than the fraction in question. For instance, in some cases the vapor mixture is passed successively through a series of condensers or dephlegmators, in each one of which one fraction is condensed and removed. But being condensed in the presence of the lower-boiling constituents, it necessarily carries away with it some of these and its quality as a close-boiling fraction is thereby impaired.

By my invention this difficulty is overcome and an efficient means is provided for obtaining from a mixed vapor one or several fractions which are close-boiling, and substantially free from materials above and below their proper boiling range and also for obtaining an unvaporized residue substantially free from constituents belonging to the vaporized portion where this is desirable.

In order to accomplish these results, the methods in general are as follows:

Where it is desired to separate into fractions a mixed vapor only, as is the case in some cracking processes and in other distillation processes, this mixed vapor is passed into a fractionating column which contains means for providing intimate contact between vapor and liquid, which means may consist of ring packing, bell-plates, spraying arrangements or other means. This contact means, of whatever nature, will be termed packing in the following description for the sake of brevity, it being understood that it may refer to any such means as above indicated. The point of entry of the mixed vapor is above the bottom, and below the top of the column, and at a level which will vary with circumstances, particularly the number and nature of the fractions desired. At or near the top of the column, condensing means are provided and a part of the vapor which emerges from the upper part of the packing is returned as liquid to the upper part of the packing. This return condensate is partially evaporated and causes partial condensation of the up-coming vapors farther down the column, and the repeated condensation and evaporation brings about fractionation in the way common to fractionating columns in general. The higher-boiling constituents fall farther and farther down through the packing, until they are below the level of the vapor inlet and they are then out of contact with the bulk of the lower-boiling constituents contained in the original mixed vapor. However, they still retain some of these lower-boiling constituents dissolved in them, and in order to remove these, further fractionation must go on in the lower part of the column. This is brought about by continuously withdrawing a part of the high-boiling liquid from the lower part of the column, heating it to a somewhat higher temperature, and returning it continuously to the lower part of the column where it provides the high-temperature heat without which fractionation in the lower part of the column could not go on. The low-boiling fraction, well separated from high-boiling material passes continuously from the top of the column and the high-boiling fraction, likewise well separated from low-boiling materials, flows continuously from an outlet in the lower part of the column. In addition, further intermediate fractions may be obtained by inserting reservoir plates at suitable points in the column, and continuously drawing off liquid in suitable quantities.

In cases where it is desirable to completely fractionate the material being distilled, that is, not only to fractionate the portion separated as vapor in the separating chamber but also to separate from the liquid residue the constituents essentially belonging to the vaporized portion, this liquid residue also may be passed into the column, preferably at a point lower down than the vapor inlet. The rest of the apparatus and operation is essentially as above described; intermediate fractions may be obtained if desired and the fraction issuing from the lowest outlet will be the highest-boiling portion of the original material, well separated from lower-boiling constituents.

It is sometimes desirable, especially where the number of final fractions is greater to separate the original vapor, or vapor and liquid into two or more preliminary, or crude, fractions before introducing them into the column and to introduce some or all of these crude fractions into the column at different points, thereby improving the conditions for fine fractionation in the column itself.

In order to further describe this invention, preferred forms of its application are given below, illustrated by the accompanying drawings in which Figs. 1, 2 and 3 are three diagrammatic views in side elevation partly in section, of three different forms of apparatus, respectively, embodying this invention.

In the drawings—

*Example 1.*—Fig. 1 is a diagrammatic representation of the process and apparatus applied to the fractionation of a mixed oil vapor into three fractions: a gasoline, a kerosene and a residue containing the highest-boiling parts of the vapor. The source of the mixed vapor may vary but an important case is that where this vapor is the main product of a continuous cracking process and in this case the heaviest fraction will be of such a nature as to be returnable to the cracking process.

In Fig. 1 the refernce character 1 refers to a fractionating column which contains rings or other known packing material, or plates with bubble-caps, or any suitable means for bringing vapor and liquid into intimate contact. 26 represents a dephlegmator containing any suitable means for providing intimate contact between ascending vapor and descending liquid. The mixed vapor which it is desired to fractionate enters the dephlegmator at its inlet 27, and ascends, being partially condensed by descending liquid. The uncondensed vapor passes out through the vapor outlet pipe 28 to the partial condenser 29 where it is partially condensed, the condensate flowing back through the return pipe 30 to supply the descending liquid in the dephlegmator 26. The vapor not condensed in the partial condenser 29 passes on through the vapor pipe 31 and enters the upper part of the fractionating column 1. The portion of the original mixed vapor which does not pass as vapor through the partial condenser 29, flows from the lower part of the dephlegmator 26 through the connecting pipe 32 and enters the lower part of the fractionating column 1. A preliminary fractionation goes on in the dephlegmator 26, according to the well known principles of repeated evaporation and condensation, and the relative amounts of the vapor fraction and the liquid fraction depend upon the rate of the supply of cooling medium to the partial condenser 29. This should be regulated to the point where substantially all of the gasoline constitutents pass on as vapor, carrying with them some of the kerosene constituents. The remainder of the kerosene constituents and all higher-boiling material, will pass through the connecting pipe 32 to the lower part of the column 1. The point where the connecting pipe 32 enters the column 1 is at a suitable distance above the bottom of the column to provide fractionating surface for the descending liquid, this distance, of course, depending upon the particular form of contact means chosen and the degree of fractionation required between the kerosene fraction and the highest-boiling fraction. The point where the vapor pipe 31 enters the column 1 is governed by similar considerations as regards its distance from the top of the column. The vapor which enters column 1 through pipe 31 is fractionated as it rises in said column by repeated condensation and evaporation with the descending liquid. The vapor which reaches the top of the column passes by vapor pipe 3 to a total condenser 4 where it is condensed and runs as liquid through in-flow pipe 5 to a divided-flow box 6. This divided-flow box may be of any suitable type and its function is to divide the stream of condensate into two streams in any suitable determined proportion. One of these streams will flow by seal 7 and out-flow pipe 8 to tank 9 and will consist of gasoline of a boiling range which will depend on the ratio between the two streams of divided condensate and upon the particular kind and quantity of the contact-producing media in the upper part of the column 1.

The other stream of divided condensate flows through the back-flow pipe 10 into the upper part of the column 1 where it joins in the fractionation process, being partially revaporized and causing partial condensation of the rising vapors. On descending through the upper part of the column 1, the liquid reaches the reservoir plate 11 through which it is prevented from descending by the bell 12 which at the same time permits vapor to rise through it. The descending liquid then flows through the in-flow pipe 13 into the divided-flow box 6', similar to 6, whence one stream (kerosene) flows through the seal 14 and the out-flow pipe 15 to the tank 16. The other stream flows through the return pipe 17 into the column 1 at a point a little below the plate 11, to take part in the fractionating. The vapors which are condensed in the column 1 by the liquid returned to it are not all revaporized by the incoming mixed vapor but a part of them in liquid form descends to the part of the column below the inlet 31. Here the highest-boiling part of the mixture collects and the fractionation here exhausts this material of practially all kerosene constituents. The necessary vaporization for this fractionation is produced by heat supplied to the bottom of the column 1 as follows:

The level of liquid in the bottom of the column 1 is held constant by having a large enough outlet pipe 18 at a definite distance from the bottom of the column 1 so that the residual fraction continually overflows through the outlet pipe 18 and the seal 19 to the tank 20. The pump 21 draws oil through the feed pipe 22 which is lower than the outlet pipe 18 and passes it through the heating coil 23 in the furnace 24 and back through the pipe 25 into the column 1. The coil 23 may in some cases preferably be placed in the same furnace as the heater used in the cracking or distillation process.

The control of this particular form of the process is accomplished by regulating the ration of back-flow through pipes 10 and 17 to out-flow through pipes 8 and 15 respectively, and by regulating the amount of heat supplied to the circulated oil in the heating pipes 23. In general, the larger the proportion of back-flow, the sharper will be the degree of fractionation, and the greater the rate of heat supply in pipes 23, the higher will be the end-boiling point of the two respective fractions. The ratio of back-flow to out-flow in each fraction is therefore set higher or lower according to the sharpness of fractionation desired in any particular case, and the rate of heat supply to the pipes 23, and therefore to the base of the column, is set sufficiently high to keep the end-boiling-points of the two respective fractions at the points desired. The end-boiling points of the fractions will depend upon the rate of revaporization of the descending liquid and this, of course, will be dependent upon the heat supplied at the base of the column. An index of the end-boiling-point of each fraction may be obtained by means of thermometers (not shown) placed respectively near the vapor outlet pipe 3 and near the reservoir plate 11. The end-boiling-point of the residual fraction cannot of course be controlled by this apparatus, as it is dependent upon the nature of the heaviest constituents of the original mixed vapor.

The form of apparatus and process above described will give a gasoline well separated from constituents belonging in the kerosene fraction, and a residual fraction well separated from kerosene constituents. In this form of apparatus the separation of the last traces of gasoline constituents from the kerosene fraction is substantially complete as the kerosene undergoes a fractionation and condensation out of contact with the gasoline vapors in the part of the column lying between the reservoir plate 11 and the point where the vapor pipe 31 enters the column.

*Example 2.*—Fig. 2 illustrates the case where a crude oil is being distilled continuously and it is desired to fractionate the total oil into three well separated fractions: a gasoline fraction, a kerosene fraction and a residual fraction. In Fig. 2 32 represents a separating chamber or vapor box such as is used in continuous stills where the mixture of liquid and vapor coming continuously from the heating means separates itself by gravity into liquid and vapor. The mixture coming from the heater (not shown) enters the separating chamber 32 by the pipe 33. The vapor flows out at the top by the vapor pipe 34 and the liquid flows out at the bottom by the connecting pipe 35. Thus, a preliminary separation of the oil into two fractions is made. These two fractions enter the fractionating column 1 at points corresponding in general to the points where the two fractions from the dephlegmator 26 enters the column in Example 1. The heat supplied to the mixed vapor and liquid before they reach the separating chamber is sufficient to cause substantially all of the gasoline constituents in the oil to pass off as vapor through the pipe 34 and, since very little fractionation (or rectification) can take place in the separating chamber, these gasoline constituents will carry off with them as vapor a considerable quantity of kerosene constituents. The remainder of the oil passes as liquid through the pipe 35 to the column 1 which contains liquid-vapor contact means as described under Example 1. The remainder of the apparatus and its operation are as described in Example 1, similar numbers representing similar parts having similar functions. This apparatus is capable of producing three well-separated fractions since there is provision for the fractionation and condensation of each one substantially out of contact with the vapors of the next fraction.

In case it is desired to produce only one overhead fraction, gasoline, the kerosene out-flow pipe 15 may be closed off, and all the liquid passing into the divided-flow box 6' be allowed to flow back to the column; or in building the apparatus the divided-flow box 6' along with its connections and also the reservoir plate 11 may be omitted entirely from the construction.

In case it is desired to take more than two overhead fractions, additional divided-flow boxes with connections and corresponding reservoir plates may be placed at suitable intervals in the column. However, with the increasing number of fractions to be removed in an arrangement of this type, the sharpness of fractionation will be reduced, and for the best results where a greater number of overhead fractions are required, an arrangement along the lines of Example 3 is preferred.

*Example 3.*—In Fig. 3 a lay-out is shown for producing continuously four overhead fractions and a residual fraction from the liquid-vapor mixture produced by heating a crude oil in the heater of a continuous still. In the drawings, Fig. 3, 36 refers to a separating chamber, or vapor box, of any suitable type, for instance, such as one of those commonly used in continuous stills. The liquid-vapor mixture produced from the crude oil in the heater (not shown) of the continuous still enters the separating chamber 36 through the inlet pipe 37 and there separates by gravity into vapor which passes out by the vapor pipe 38, and liquid which passes out by the feed pipe 39 to the pump 40. The pump 40 forces the liquid through the pipe 41, the heating coil 42 and the transfer pipe 43 to the second separating chamber 44. The heat supplied to the heating coil 42, which is set in the furnace 45, vaporizes part of the liquid and this vapor is separated by gravity from the residual liquid in the second separating chamber 44. The vapor so separated passes out through the vapor pipe 46 and the residual liquid passes out through the connecting pipe 47 and flows into the lower part of the fractionating column 48. This fractionating column 48 contains means for providing intimate contact between liquid and vapor, as described in connection with the fractionating column in Example 1. The vapors passing through vapor pipes 38 and 46 also enter the column 48 at points respectively in the upper part and near the middle of the height of the column. The column 48 contains three reservoir plates 49 with bells 50. Adjacent to the respective reservoir plates 49 are divided flow boxes 51 having in connection with them in-flow pipes 52, back-flow pipes 53, out-flow pipes 54 and seals 55, leading to tanks 56. Each of these three reservoir plates 49 with its bell 50, adjacent divided-flow box 51 and connected apparatus 52, 53, 54, 55 and 56 as described above, is for handling one fraction, the functions and operation of these parts of the apparatus being as described in Example 1. The uppermost reservoir plate 49 is placed at a level between the points where the two vapor pipes 38 and 46 respectively join the column 48. The other two reservoir plates 49 are placed successively between the entrance of the vapor pipe 46 to the column, and the entrance of the connecting pipe 47 to the column. The vapor reaching the top of the column passes out through the vapor outlet pipe 57 to the total condenser 58, where it is condensed. The liquid passes through the in-flow pipe 59 to the divided-flow box 60, where it is divided into two streams in suitable proportions as described in Example 1. One stream returns to the upper part of the column through the back-flow pipe 61, to provide descending liquid for fractionation, and the other stream (gasoline) flows through the out-flow pipe 62 containing the seal 63 to the tank 64. The arrangements at the base of the column are exactly similar to those described in Example 1. The residual fraction flows out continuously through the out-flow pipe 65 containing the seal 66 to the tank 67. The feed pipe 68 supplies oil to the pump 69 which circulates the oil through the pipe 70, the second heating coil 71 and the pipe 72, back to the lower part of the column, the heat supplied in the heating coil 71 providing the necessary heat for vaporization and fractionation in the lower part of the column.

The character of the five fractions formed may be controlled by the amount of heat supplied to the first heating coil 42 (it being assumed that the heat originally supplied to the oil was sufficient to cause the separation in the first separating chamber 36 of substantially all of the gasoline constituents as vapor) as well as by the heat supplied to the second heating coil 71, and by the proportion of back-flow from the divided-flow boxes. In most cases the heat supplied in the coil 42 will be sufficient to vaporize substantially all of the kerosene constituents. The fractions removed at the three reservoir plates will normally be respectively kerosene, gas oil and a lubricating oil fraction. If the lubricating oil fraction be not desired, the lowest reservoir plate may be omitted, or the corresponding out-flow pipe closed. In general, the operation and the modification of the fractions obtained is according to the methods described in Example 1 and need not be gone into in further detail.

In all of the examples given it is obvious that various changes may be made without departing from the spirit of the invention and it is not intended to limit the invention to the exact forms or uses described. For instance, although the examples have been taken from problems occurring in the petroleum industry, the invention is applicable also to other industries in which fractional distillation is practiced, such as the coal-tar industry. In the case of the distillation of coal tar, where only two or three overhead fractions are required, the apparatus and process may be used along the lines indicated in Example 1. Where several overhead fractions are required, the general lines of Example 3 may preferably be followed with the exception that the residual liquid from the second separating chamber 44 (Fig. 3) may be collected directly and not passed into the column because of the usually high content of free carbon existing in such residues (pitches) derived from coal tar and their tendency, when hot, to deposit carbon on surfaces with which they come in contact.

In reference to the condensers mentioned in the several examples, it is evident that although the drawings indicate them as being supplied with only one cooling medium, which would usually be water, they may in some cases preferably be cooled partly by water (the final cooling) and partly by the crude material to be distilled (the initial cooling), a preheating of the latter thus being accomplished with a consequent economy of fuel.

In the claims the word "column" is intended to include any means for fractionating by intimate and repeated contact of liquid and vapor and thus includes columns, towers, or condensers packed with rings, coke, rock or other packing, or containing bubble-plates, means for agitating or spraying the liquid, or any other means for bringing about repeated and intimate contact between liquid and vapor.

In the claims the expression "petroleum oil" is understood to refer not only to crude petroleum but to any oil or mixture of oils derived from petroleum whether by distillation, cracking or other means, and the term further is understood to include such oils either in the liquid or in the vapor phase, or existing as a mixture of liquid and vapor.

Claims:

1. In a column for fractionating mixed fluids, means for withdrawing from said column a part at least of the liquid formed by condensation therein, means for heating the withdrawn liquid, and means for passing said withdrawn liquid through said heating means and back into said column, in combination with means for separating into a first liquid fraction and a first vapor fraction said mixed fluids previous to their entry into the column, means for reheating and partially vaporizing said first liquid fraction, means for separating the partially vaporized first liquid fraction into a second liquid fraction and a second vapor fraction, and means for introducing said first vapor fraction, said second vapor fraction and said second liquid fraction individually into said column at different points.

2. In a column for fractionating mixed fluids, means for withdrawing from said column a part at least of the liquid formed by condensation therein, means for heating the withdrawn liquid, and means for passing said withdrawn liquid through said heating means and back into said column, in combination with means for separating into a first liquid fraction and a first vapor fraction said mixed fluids previous to their entry into the column, means for reheating and partially vaporizing said first liquid fraction, means for separating the partially vaporized first liquid fraction into a second liquid fraction and a second vapor fraction, and means for introducing said first vapor fraction, and said second vapor fraction individually into said column at different points.

3. In a column for continuously fractionating mixed fluids, means for continuously withdrawing, heating to a predetermnied temperature and returning into said column a predetermined proportion of the liquid continuously collecting at one level in said column, in combination with means for separating said mixed fluids into at least three crude fractions previous to their entry into said column and means for introducing said crude fractions individually into said column at different levels.

4. In a column for continuously fractionating mixed fluids, means for continuously withdrawing, heating to a predetermined temperature and returning into said column, a predetermined proportion of the liquid collecting continuously in the bottom of said column, in combination with means for separating into at least three crude fractions said mixed fluids previous to their entry into said column, and means for introducing into said column individually at different levels the highest boiling of said crude fractions and one at least of the others.

5. In a column for continuously fractionating mixed fluids, means for withdrawing from said column, heating to a predetermined temperature and returning into said column a predetermined proportion of the liquid fraction collecting at the bottom of said column, in combination with means for separating said mixed fluids into at least three crude fractions previous to their entry into said column, means for introducing said crude fractions individually into said column at different points, and means for withdrawing a plurality of finished fractions from said column at levels substantially removed from the respective entrance levels of said crude fractions.

6. In the process of continuously fractionating mixed fluids, the step which comprises withdrawing from the fractionating means, heating to a predetermined temperature, and returning into said fractionating means a predetermined proportion of the liquid collecting at one level in said fractionating means, while separating into a first liquid fraction and a first vapor fraction said mixed fluids previous to their entry into said fractionating means, reheating and partially vaporizing said first liquid fraction, separating the partially vaporized first liquid fraction into a second liquid fraction and a second vapor fraction, and introducing said first vapor fraction, said second vapor fraction and said second liquid fraction individually into said fractionating means at different levels.

7. In the process of continuously fractionating mixed fluids, the step which comprises withdrawing from the fractionating means, heating, and returning thereinto a part at least of the liquid collecting at one level therein, while separating said mixed fluids into at least three crude fractions previous to their entry into said fractionating means, and introducing said crude fractions individually into said fractionating means at different points.

8. In the process of fractionating mixed fluids, the step which comprises withdrawing from the fractionating means, heating to a predetermined temperature and returning into said fractionating means a predetermined proportion of the liquid collecting at on level therein, while separating said mixed fluids previous to their entry into said fractionating means, into at least three crude fractions, and introducing some at least of said crude fractions, including the highest-boiling one, individually into said fractionating means at different points.

9. In the process of fractionating mixed fluids, the step which comprises withdrawing from the fractionating means, heating to a predetermined temperature and returning into said fractionating means a predetermined proportion of the liquid collecting at the bottom of said fractionating means, while separating said mixed fluids previous to their entry into said fractionating means, into at least three crude fractions, and introducing all of said crude fractions individually into said fractionating means at different points.

10. In the process of fractionating mixed fluids, the step which comprises withdrawing from the fractionating means, heating to a predetermined temperature, and returning into said fractionating means a predetermined proportion of the liquid fraction collecting at the bottom of said fractionating means, while separating said mixed fluids previous to their entry into said fractionating means into at least three crude fractions, introducing said crude fractions individually into said fractionating means at different levels, withdrawing two finished fractions at the bottom and top respectively of said fractionating means, and withdrawing other finished fractions at levels substantially removed from the respective entrance levels of said crude fractions.

11. In the process of continuously fractionating a fluid mixture, the step consisting in partially vaporizing it, separating it into a first vapor fraction and a first liquid fraction, partially vaporizing said first liquid fraction, separating it into a second liquid fraction and a second vapor fraction, and introducing said first vapor fraction, said second vapor fraction and said second liquid fraction individually into a single fractionating column at different levels, while withdrawing liquid from a part of the said column below the entrance points of the three said fractions, passing said liquid through a heating means and returning said liquid to said column at a point near its exit point.

In testimony whereof, I hereby affix my signature.

JOHN V. E. DICKSON.